Jan. 8, 1924.  1,480,378
C. F. DE ARMOND
FISHING TOOL
Filed March 29, 1922   2 Sheets-Sheet 2
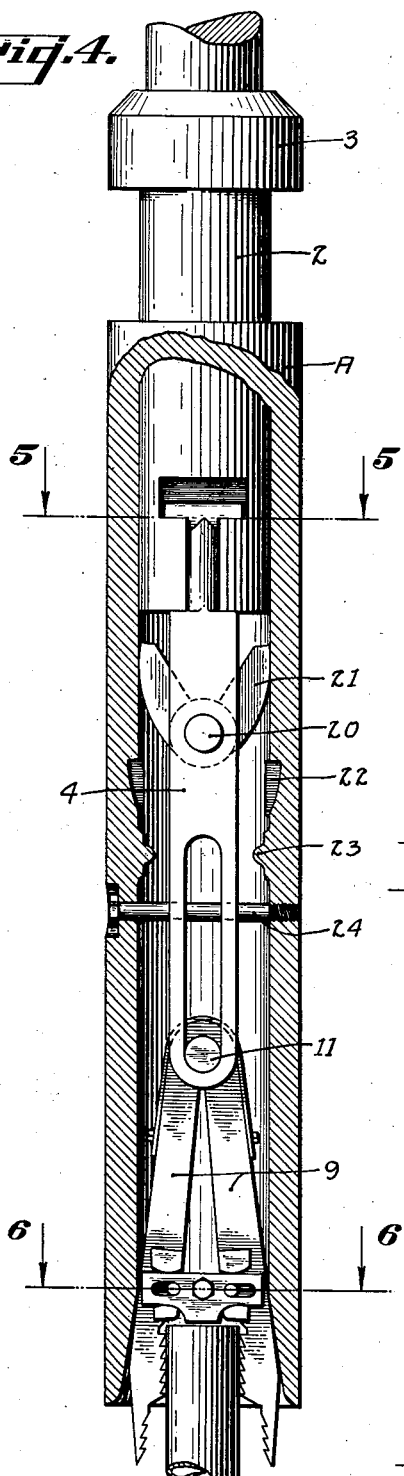
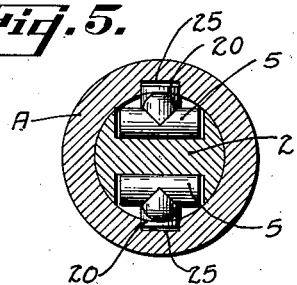
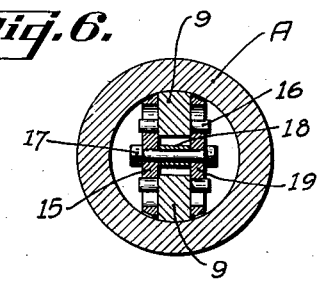
Inventor
CHARLES F. DeARMOND.
By Dewey, Strong, Townsend and Loftus
Attys Patented Jan. 8, 1924.

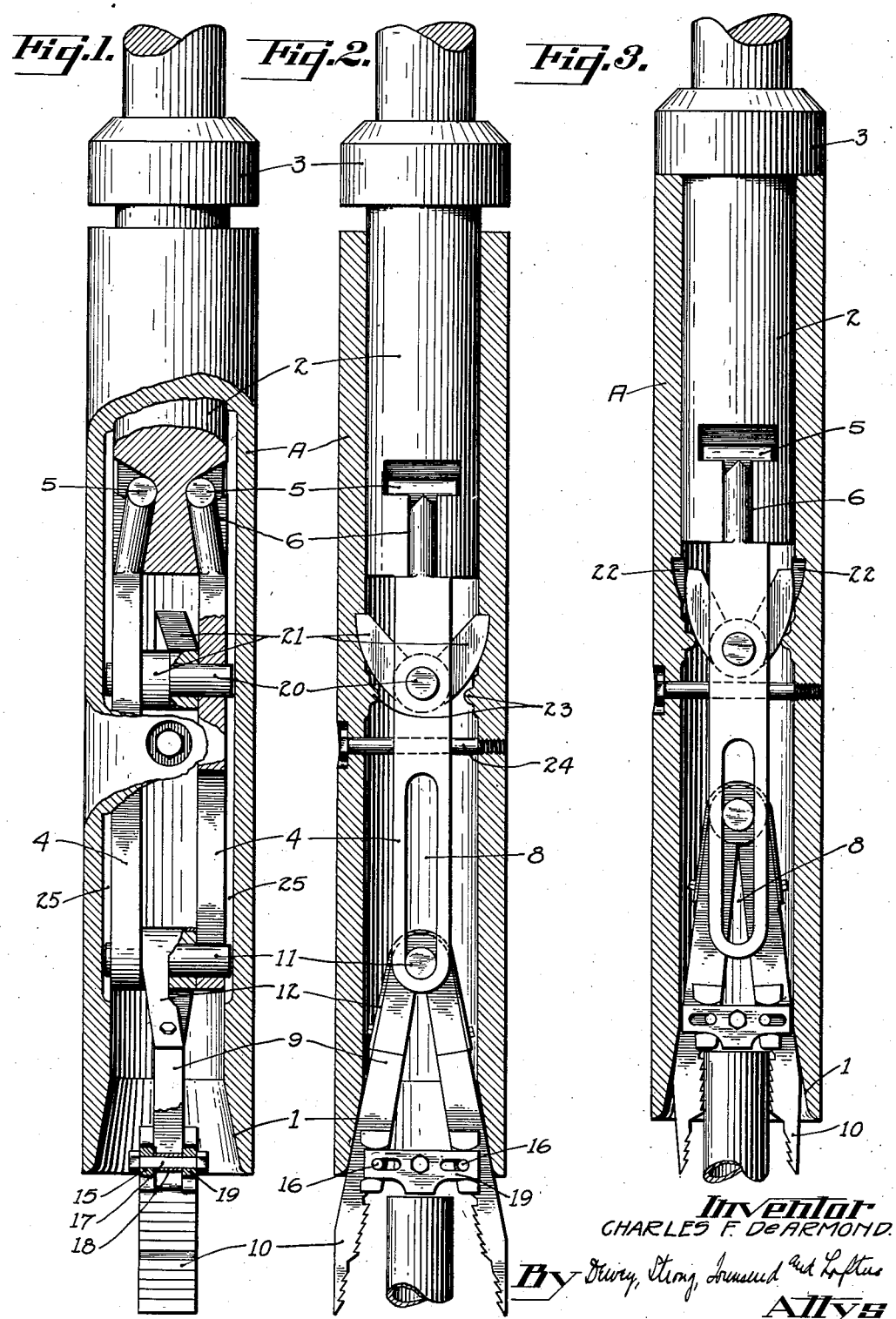

1,480,378

UNITED STATES PATENT OFFICE.

CHARLES F. DE ARMOND, OF ELKO, NEVADA, ASSIGNOR TO ELKO DRILL CO., OF ELKO, NEVADA, A CORPORATION OF NEVADA.

FISHING TOOL.

Application filed March 29, 1922. Serial No. 547,778.

*To all whom it may concern:*

Be it known that I, CHARLES F. DE ARMOND, a citizen of the United States, residing at Elko, county of Elko, and State of Nevada, have invented new and useful Improvements in Fishing Tools, of which the following is a specification.

This invention relates to tools for recovering articles from drill holes and the like, and particularly to such tools commonly referred to as fishing tools.

The object of the present invention is to generally improve and simplify tools of the character described; to provide a tool which may be readily engaged or released with relation to the article to be removed; a tool adapted to receive gripping jaws of varying formation or shape, and further to provide a plunger and driving head whereby a hammer or jarring action may be imparted to force the gripping jaws securely into engagement with the object to be recovered. Other objects will hereinafter appear.

The invention consists of the parts and the construction, combination and arrangement of parts as hereinafter more fully described and claimed, having reference to the accompanying drawings, in which—

Fig. 1 is a central, vertical, longitudinal section through the fishing tool.

Fig. 2 is a similar section taken at right angles thereto and showing the gripping jaws in open position.

Figs. 3 and 4 are sections similar to Fig. 2, but showing the gripping jaws in engaging position.

Fig. 5 is a cross section on line 5—5, Fig. 4.

Fig. 6 is a cross section on line 6—6, Fig. 4.

Referring to the accompanying drawings, and particularly to Figs. 1 and 2, A indicates a tubular shell or casing provided with interior inclined faces 1, which are formed adjacent the lower end thereof. Slidably mounted in the shell is a plunger 2 on the upper end of which is formed a driving head 3. Attached to or suspended from the plunger 2 is a pair of hangers 4, the upper ends of which terminate in T-shaped heads 5, said heads engaging slots or grooves 6 formed in opposite sides of the plunger. The lower ends of the hangers 4 are slotted, as at 8, and form a support for a floating shaft 11, on which is pivotally mounted a pair of arms 9 terminating in gripping jaws 10. A leaf-spring or plate 12 encloses the upper ends of the arms 9 and the normal tension of this spring is such that the arms will be held in open position as indicated in Fig. 2. For the purpose of limiting the opening or spreading movement of the arms 9, and the jaws formed in the lower ends thereof, a pair of plates 15 and 19 is employed. These plates are slotted at their outer ends as shown and straddle pins 16 carried by the respective arms; the two plates being joined or secured by a bolt 17 surrounded by a sleeve 18; said sleeve maintaining a fixed spacing between the plates so as not to impose any friction or restrict the movement of the arms and gripping jaws, and the pin and sleeve further serve as a buffer to stop the downward movement of the jaws when they are in proper position to grip the object to be recovered. The floating shaft 11 is guided by a pair of channels or grooves 25 formed on the inner side of the shell A, and the slots 8 formed in the hangers 4 permit the floating shaft to remain stationary while the shell A, the plunger 2 and the parts attached thereto may be raised or lowered as will hereinafter be described.

Pivotally mounted between the upper ends of the hangers 4 is a pair of dogs or pawls 21. These dogs are carried by a shaft or pin 20 extending through the hangers, and this shaft is also guided by the slots 25, thus preventing rotation of the shell and plunger with relation to the hangers and gripping jaws.

Formed on the interior surface of the shell is a pair of recesses 22, with which the upper ends of the pawls are adapted to engage, and formed below said notches or recesses is a pair of cams or lugs 23 whereby inward or releasing movement may be imparted to the dogs. By a rapid upward pull on the plunger 2, the dogs 21 will pass the notches 22 before touching the sides of the shell, thereby permitting the hangers to engage the floating shaft 11 and so lift the arms and the engaged object from its position in the hole or well as shown in Fig. 4. Should it be the desire of the operator to release the object while still in the well, the tool is lowered until the driving head makes contact with the upper end of the shell as in Fig. 3; then by raising the plunger slowly the dogs will re-engage the notches 22 and the shell may be pulled upwardly away from the jaws to the position shown in Fig. 2, thus permitting opening or spreading of the same and release of the object previously engaged. A safety bolt 24 is provided for the purpose of preventing the shell from becoming detached from the other parts of the tool, except at the will of the operator. By its removal the plunger and the parts attached thereto may be withdrawn from the shell and the parts disassembled for inspection and repair, or to permit insertion of gripping jaws of various shapes.

It should be evident that jaws of various shapes from those illustrated in the drawing may be advantageously employed as their formation will depend entirely upon the size and shape of the object to be recovered.

By referring to Figs. 2 and 3, it is evident that when the object to be recovered arrests the downward course of the jaws 10 by contacting with plates 15 and 19, or any portion of the jaws, the shell A and plunger 2 will continue their downward movement. The inclined faces or cams 1 will thus engage the exterior faces of the gripping jaws and force them inwardly to a gripping position. By the use of jaws of standard construction, which may be placed on the string of tools above the fishing tool proper, the shell may be driven tightly over the arms or gripping jaws, thus forcing the teeth thereof securely into the object to be recovered. This is an important feature as it often happens when ordinary fishing tools are employed that the connection made with the lost article is so insecure that it is often lost before it reaches the surface, thus materially prolonging the operation and increasing the difficulties encountered.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. A fishing tool comprising an elongated cylindrical shell, a plunger slidably mounted therein, a hammer head on said plunger engageable with the upper end of the shell, a pair of gripping jaws carried by the plunger and having a free vertical sliding movement with relation thereto, and a tapered portion on the lower end of the shell adapted to be driven downwardly over the jaws to increase their grip and to secure the jaws in gripping position.

2. A fishing tool comprising an elongated cylindrical shell, a plunger slidably mounted therein, a driving head on said plunger engageable with the upper end of the shell, a pair of gripping jaws carried by the plunger and having a vertical sliding movement with relation thereto, and means on the shell for engaging and closing said jaws.

3. A fishing tool comprising a cylindrical elongated shell, a plunger slidably mounted therein, a hammer head on said plunger engageable with the upper end of the shell, a pair of hangers attached to the plunger within the shell, a floating shaft carried by said hangers, and a pair of gripping jaws pivotally attached to the floating shaft.

4. A fishing tool comprising a cylindrical elongated shell, a plunger slidably mounted therein, a hammer head on said plunger engageable with the upper end of the shell, a pair of hangers attached to the plunger within the shell, a floating shaft carried by said hangers, a pair of gripping jaws pivotally attached to the floating shaft, and means on the shell engageable with the jaws to close the same.

5. A fishing tool comprising a cylindrical elongated shell, a plunger slidably mounted therein, a hammer head on said plunger engageable with the upper end of the shell, a pair of hangers attached to the plunger within the shell, a floating shaft carried by said hangers, a pair of gripping jaws pivotally attached to the floating shaft, means on the shell engageable with the jaws to close the same, and other means for normally maintaining the jaws in open position.

6. A fishing tool comprising a cylindrical elongated shell, a plunger slidably mounted therein, a hammer head on said plunger engageable with the upper end of the shell, a pair of hangers attached to the plunger within the shell, a floating shaft carried by said hangers, a pair of gripping jaws pivotally attached to the floating shaft, means on the shell engageable with the jaws to close the same, other means for normally maintaining the jaws in open position, and means for limiting the opening movement of the jaws.

7. In a fishing tool of the character described the combination with the shell and the plunger slidable therein, of a pair of hangers pivotally attached to the plunger within the shell, vertically disposed slots formed in said hangers, a floating shaft extending through said slots, and a pair of gripping jaws pivotally attached to said shaft.

8. In a fishing tool of the character described the combination with the shell and the plunger slidable therein, of a pair of hangers pivotally attached to the plunger within the shell, vertically disposed slots formed in said hangers, a floating shaft extending through said slots, a pair of gripping jaws pivotally attached to said shaft, a pair of pawls pivotally mounted between the hangers, notches formed in the interior surface of the shell with which said dogs are engageable, and other means for moving the jaws out of engagement with said notches.

9. A fishing tool of the character described comprising a cylindrical elongated shell, a plunger slidably mounted therein, a hammer head on said plunger engageable with the upper end of the shell, and a pair of floating gripping jaws suspended from the plunger.

10. A fishing tool of the character described comprising a cylindrical elongated shell, a plunger slidably mounted therein, a hammer head on said plunger engageable with the upper end of the shell, a pair of floating gripping jaws suspended from the plunger, and means actuated by movement of the shell and plunger for closing or releasing the jaws with relation to the object to be recovered.

11. A fishing tool comprising a cylindrical elongated shell, a plunger slidably mounted therein, a pair of hangers pivotally attached to the plunger within the shell, floating gripping jaws carried by said hangers, and means permitting movement of the plunger and hangers a predetermined distance independently of the shell when the jaws are in gripping engagement.

12. A fishing tool comprising a cylindrical elongated shell, a plunger slidably mounted therein, a pair of hangers pivotally attached to the plunger within the shell, floating gripping jaws carried by said hangers, and a pin secured in the shell and extending between the hangers to prevent removal of the plunger, hangers and gripping jaws with relation to the shell.

13. A fishing tool comprising a cylindrical elongated shell, a plunger slidably mounted therein, a pair of hangers pivotally attached to the plunger within the shell, floating gripping jaws carried by said hangers, and means for locking the plunger and hangers with relation to the shell when the jaws are in gripping position.

14. In a fishing tool of the character described the combination with the shell, the plunger and the hangers pivotally attached thereto, said hangers having slots formed in their lower ends, of a floating shaft extending through said slots, grooves formed on the interior of the shell receiving the ends of said floating shaft and forming a guide therefor, and a pair of gripping jaws pivotally attached to the floating shaft, means for normally maintaining the jaws in open position, means carried by the jaws for limiting the opening movement thereof, means on the shell engageable with the jaws to close the same, and means for imparting a hammering movement to the shell when the jaws are in gripping position.

CHARLES F. DE ARMOND.